ated at their free ends, which are pointed,

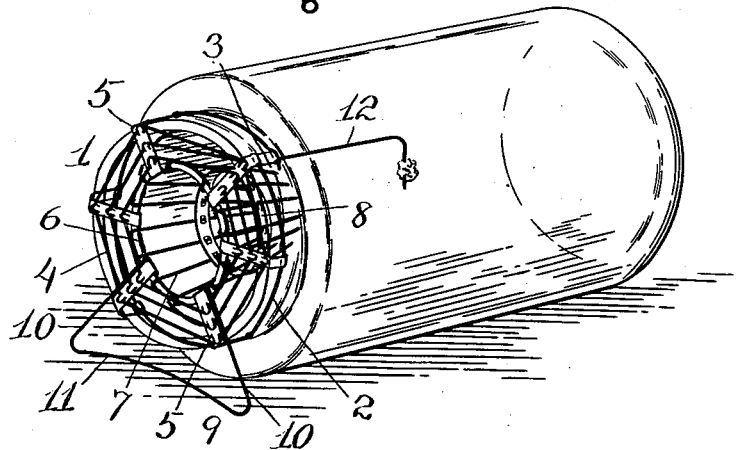
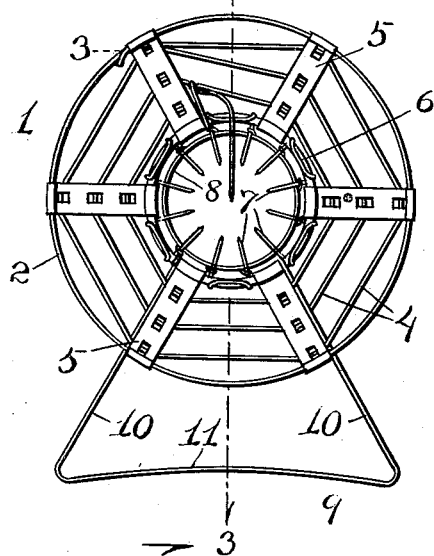
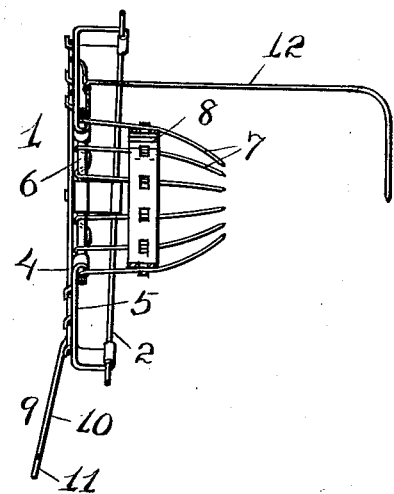

UNITED STATES PATENT OFFICE.

JOSEPH S. C. SOWAR, OF BRAZIL, INDIANA.

ANIMAL-TRAP.

1,077,104.  Specification of Letters Patent.  Patented Oct. 28, 1913.

Application filed February 19, 1913. Serial No. 749,380.

*To all whom it may concern:*

Be it known that I, JOSEPH S. C. SOWAR, a citizen of the United States, resident of Brazil, in the county of Clay and State of Indiana, have made a certain new and useful Invention in Animal-Traps; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied. Fig. 2 is a rear view of the invention. Fig. 3 is a section on the line 3—3 Fig. 2.

The invention has relation to animal traps, designed mainly for use with the common screw top or Mason fruit jar in catching rats and mice, and it consists in the novel construction and combinations of parts as hereinafter set forth.

In the accompanying drawings illustrating the invention, the numeral 1, designates a carrier or body designed to be screwed upon the fruit jar in place of the ordinary top of said jar, said carrier being formed preferably of wire, and having an outer approximately annular part 2 inclined and curved screw fashion with an interval 3 between the ends of the part 2, said part engaging between the threads of the jar neck. Connected to the outer wire part is an intermediate wire filling or part 4, formed preferably in one piece in a single coil and connected to the outer wire 2 by radial braces 5, 5.

An inner central ring 6 is provided, and the braces 5, 5, have at their inner ends connection with said ring to hold it securely in position. Extending laterally from the inner ring are a circular series of spring wires 7, 7, spaced apart and converging toward their free ends, which are pointed, said wires being usually stiffened by an intermediate circular brace 8, connecting the same.

It is desirable to provide means for preventing rolling of the bottle which is usually placed upon its side. For this purpose, a laterally extending base 9 is employed, said base being also of wire and having radial branches 10, connected at their inner ends to the ring 6, and passing inward and outward in an interlacing manner between the wires of the intermediate wire filling at the outside of the lower radial braces, so that any lateral movement of said branches will be resisted by said braces. The branches 10 of the base are connected by a transverse arm 11, resting upon the floor or ground.

A bait holder is provided at 12, or the bait may be loosely placed within the jar.

The animal enters through the opening of the ring 6, and passing inward between the wires 7, 7, said wires will expand or spring outward to allow the body of the animal to pass into the jar, after which the wires will contract or spring back to normal position, and prevent the animal from passing out again.

The invention comprises a jar top of open wire work which, together with the glass jar, forms a transparent whole.

What I claim is:—

1. In an animal trap, a top for a jar, comprising an inner ring, radial braces connected to said ring and having angularly turned outer end portions, an outer approximately annular inclined wire screw located within and connected to said end portions, an intermediate wire filling, carried by said braces, and a circular series of inwardly and laterally extending spring wires having connection with said inner ring and provided with converging ends and bracing means.

2. In an animal trap, a top for a jar comprising an inner ring, radial braces connected to said ring and having angularly turned outer end portions, an outer approximately annular inclined wire screw located within and connected to said end portions, an intermediate wire filling coil carried by said braces, a circular series of inwardly and laterally extending spring wires having connection with said inner ring and provided with converging free ends and bracing means, and a wire base having radial arms connected to said inner ring, passing in and out between the coils of the wire filling and located at the outside and adjacent to the lower of said braces in bracing engagement therewith.

In testimony whereof I affix my signature, in presence of two witnesses.

JOSEPH S. C. SOWAR.

Witnesses:
    CHARLES H. SOWAR,
    MARGARET RILEY.